United States Patent
Kamiya et al.

(10) Patent No.: US 9,759,258 B2
(45) Date of Patent: Sep. 12, 2017

(54) SLIDING MEMBER

(71) Applicant: TAIHO KOGYO CO., LTD., Toyota-shi, Aichi (JP)

(72) Inventors: Shu Kamiya, Toyota (JP); Toshiyuki Chitose, Toyota (JP); Takashi Tomikawa, Toyota (JP); Yasunori Kabeya, Toyota (JP); Taichi Yoshimi, Toyota (JP)

(73) Assignee: Taiho Kogyo Co., Ltd. (JP)

( * ) Notice: Subject to any disclaimer, the term of this patent is extended or adjusted under 35 U.S.C. 154(b) by 0 days.

(21) Appl. No.: 14/758,167

(22) PCT Filed: Dec. 24, 2013

(86) PCT No.: PCT/JP2013/084458
§ 371 (c)(1),
(2) Date: Jun. 26, 2015

(87) PCT Pub. No.: WO2014/104002
PCT Pub. Date: Jul. 3, 2014

(65) Prior Publication Data
US 2015/0330445 A1    Nov. 19, 2015

(30) Foreign Application Priority Data

Dec. 27, 2012  (JP) ................. 2012-285578

(51) Int. Cl.
*F16C 33/10* (2006.01)
*F16C 33/20* (2006.01)
(Continued)

(52) U.S. Cl.
CPC ........... *F16C 33/201* (2013.01); *B32B 15/00* (2013.01); *B32B 15/04* (2013.01); *B32B 27/00* (2013.01);
(Continued)

(58) Field of Classification Search
CPC ...... F16C 33/20; F16C 33/201; F16C 33/203; F16C 33/205; F16C 2202/50;
(Continued)

(56) References Cited

U.S. PATENT DOCUMENTS 4,235,481 A * 11/1980 Fukuoka ............... F16C 17/022
                                                     384/429
6,921,205 B2 * 7/2005 Kanayama .......... F04B 27/0873
                                                     384/13
(Continued)

FOREIGN PATENT DOCUMENTS

DE    102008039740 A1    3/2010
DE    102008055194 A1    7/2010
(Continued)

OTHER PUBLICATIONS

Extended European Search Report for Patent Application No. EP13868501.1 dated Jul. 8, 2016 (7 pages).
(Continued)

*Primary Examiner* — Phillip A Johnson
(74) *Attorney, Agent, or Firm* — Harness, Dickey & Pierce, P.L.C.

(57) ABSTRACT

A sliding member includes: a lining layer formed from an alloy having a predetermined shape; and an overlay layer formed on an inner circumferential surface of the lining layer, the overlay layer being formed of a resin, the overlay layer sliding with a shaft, the overlay layer including a raised portion a height of which in a predetermined area including each of an edge in an axial direction of the shaft is greater than a height of another area of the overlay layer.

20 Claims, 3 Drawing Sheets

(51) Int. Cl.
  F16C 17/02    (2006.01)
  F16C 9/00     (2006.01)
  C09D 179/08   (2006.01)
  C09D 159/00   (2006.01)
  C09D 161/06   (2006.01)
  B32B 15/00    (2006.01)
  B32B 15/04    (2006.01)
  B32B 27/00    (2006.01)
  B32B 27/06    (2006.01)
  C08G 73/14    (2006.01)
  C10M 125/00   (2006.01)
  C08K 3/30     (2006.01)

(52) U.S. Cl.
  CPC .............. *B32B 27/06* (2013.01); *C08G 73/14* (2013.01); *C09D 159/00* (2013.01); *C09D 161/06* (2013.01); *C09D 179/08* (2013.01); *C10M 125/00* (2013.01); *F16C 9/00* (2013.01); *F16C 17/02* (2013.01); *F16C 33/103* (2013.01); *F16C 33/106* (2013.01); *F16C 33/206* (2013.01); *F16C 33/208* (2013.01); *B32B 2307/50* (2013.01); *B32B 2307/746* (2013.01); *C08K 2003/3009* (2013.01); *C10M 2201/041* (2013.01); *C10M 2201/061* (2013.01); *C10M 2201/062* (2013.01); *C10M 2201/065* (2013.01); *C10M 2209/003* (2013.01); *C10M 2213/062* (2013.01); *C10M 2217/0443* (2013.01); *C10M 2221/003* (2013.01); *C10N 2230/06* (2013.01); *C10N 2240/02* (2013.01); *C10N 2250/141* (2013.01); *F16C 17/022* (2013.01); *F16C 2202/54* (2013.01); *F16C 2208/02* (2013.01); *F16C 2223/42* (2013.01); *F16C 2240/60* (2013.01); *F16C 2360/22* (2013.01)

(58) Field of Classification Search
  CPC .... F16C 2202/52; F16C 2202/54; F16C 9/02; F16C 33/1075

USPC ....... 384/276, 282, 283, 291, 292, 297, 907, 384/288, 294
  See application file for complete search history.

(56) References Cited

U.S. PATENT DOCUMENTS

| | | | | |
|---|---|---|---|---|
| 8,167,496 | B2* | 5/2012 | Issler | F16C 25/04 384/282 |
| 8,322,929 | B2* | 12/2012 | Issler | F16C 33/1025 384/283 |
| 2003/0235355 | A1* | 12/2003 | Hiramatsu | F16C 33/10 384/276 |
| 2004/0008914 | A1* | 1/2004 | Hiramatsu | F16C 33/201 384/276 |
| 2006/0083451 | A1 | 4/2006 | Kawagoe et al. | |
| 2008/0241515 | A1* | 10/2008 | Tanaka | F16C 33/201 428/330 |
| 2010/0054639 | A1 | 3/2010 | Issler et al. | |
| 2011/0268944 | A1 | 11/2011 | Adam et al. | |
| 2012/0308168 | A1* | 12/2012 | Watanabe | F16C 33/205 384/276 |

FOREIGN PATENT DOCUMENTS

| | | |
|---|---|---|
| EP | 1584828 A1 | 10/2005 |
| GB | 2338995 A | 1/2000 |
| JP | S64-30923 A | 2/1989 |
| JP | 2001-032837 A | 2/2001 |
| JP | 2004-211859 A | 7/2004 |
| JP | 2007-232145 A | 9/2007 |
| JP | 2012-514170 A | 6/2012 |
| WO | WO-2012-069192 A1 | 5/2012 |

OTHER PUBLICATIONS

Japanese Office Action for Application No. 2014-554446 dated Nov. 8, 2016 (8 pages) with English translation.

* cited by examiner

SLIDING MEMBER

FIELD

The present invention relates to a sliding member used as, for example, a sliding bearing.

RELATED ART

Reducing wear and seizure is a well-known technical object in the art of sliding bearings. To address this technical object, patent document 1, for example, discloses an inner periphery tapered in an axial direction. Further, patent document 1 also discloses provision of a concave portion (lubricating oil reservoir portion) to increase a reserve capacity of lubricating oil.

FIGS. 3 and 4 show an exemplary main bearing 501 in accordance with a related art. Main bearing 501 has half bearings 503 and 505. Half bearings 503 and 505 are combined so as to form a cylindrically shaped bearing. Each of half bearings 503 and 505 has back metal 507, lining layer (bearing metal layer) 509, and overlay layer 511. Half bearing 503 has oil hole 515. Oil hole 515 is connected with an oil groove 513. Oil groove 513 is open to the outside through oil hole 515. Half bearing 505 has indentation 517 at such a position that it aligns with oil groove 513 to form a continuous groove with oil groove 513.

As shown in FIG. 4, the edge of main bearing 501 in the axial direction has a tapered shape in which the inner diameter gradually increases from the center to the edge in the axial direction. In tapered part 519, plural groves 521 function as oil retainers extending in a circumferential direction. Grooves 521 are provided on overlay layer 511 of upper half bearing 503 and lower half bearing 505.

SUMMARY

Problem to be Solved

In the technology disclosed in JP 2001-32837A, an inner diameter gradually increases from the center to the edge in the axial direction, as a result of which lubrication oil flows from the edge when an engine is stopped. In this configuration, there arises a problem that a starting torque is relatively high due to a low amount of lubrication oil being retained other than in oil retainers (grooves 521).

The present invention provides a sliding member with an improved function to retain oil and provides a lower friction torque when starting an engine.

Solution

The present invention provides a sliding member including: a lining layer formed from an alloy having a predetermined shape; and an overlay layer formed on an inner circumferential surface of the lining layer, the overlay layer being formed of resin, the overlay layer sliding with a shaft, the overlay layer including a raised portion a height of which in a predetermined area that includes each of an edge in an axial direction of the shaft is greater than a height of another area of the overlay layer.

The raised portion may include a top between a starting point and the edge of the sliding member in the axial direction, the starting point being an edge of the raised portion, the sliding member having width K in the axial direction, with a distance between the starting point and the edge of the sliding member being less than K/2.

A difference between a first thickness and a second thickness may be less than or equal to 6 micrometers, the first thickness being a thickness of the overlay layer at the another area, the second thickness being a thickness of the overlay layer at the top.

The overlay layer may consist of at least one of a solid lubricant and hard particles in addition to a binder resin.

The binder resin may consist of at least one of a polyamide-imide (PAI) resin, polyimide resin, phenolic resin, polyacetal resin, poly-ether-ether-ketone resin, and polyphenylenesulfide resin.

The solid lubricant may consist of at least one of $MoS_2$, PTFE, graphite, $WS_2$, and $SB_2O_3$.

The hard particles may consist of at least one of SiC, $Al_2O_3$, AlN, $CrO_2$, $Si_3N_4$, $ZrO_2$, and $Fe_3P$.

Effect of the Invention

According to the present invention, the improved function to retain oil and provide a lower friction torque when starting an engine resides in provision of a sliding member.

DESCRIPTION

Figure 1:
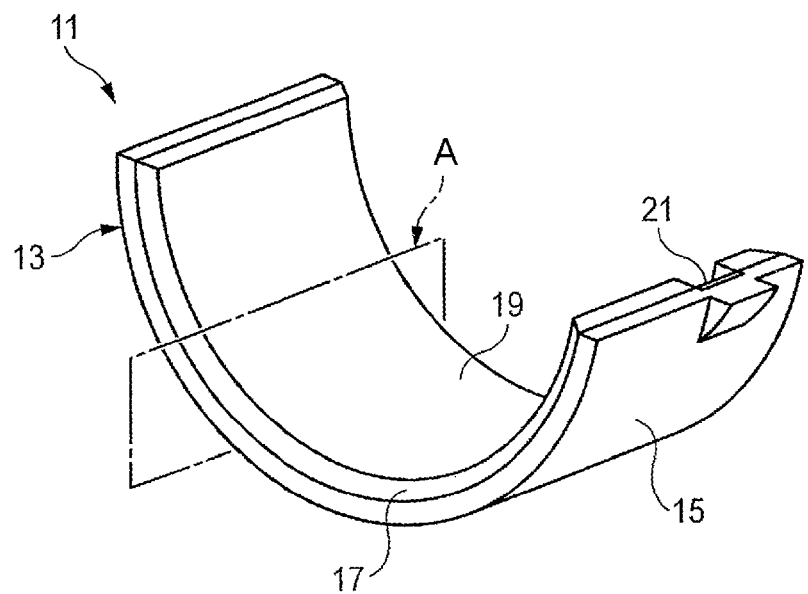
FIG. 1 shows an exemplary structure of main bearing 11 in accordance with one embodiment.

FIG. 1 shows an exemplary structure of main bearing 11 in accordance with one embodiment of the present invention. Main bearing 11 is an example of a sliding member used as, for example, a bearing installed in a connecting rod so as to support a crankshaft of an engine, or a bearing installed in an engine block so as to support a crankshaft of an engine. Main bearing 11 consists of a pair of half bearings 13. The pair of half bearings 13 is combined to form a cylindrical-shaped bearing. For the purpose of simplification, in FIG. 1 a single half bearing 13 is shown.

Half bearing 13 has backing metal 15, lining layer (bearing alloy layer) 17, and overlay layer 19. Backing metal 15 supports a mechanical strength of lining layer 17. Backing metal 15 is made of, for example, steel. Lining layer 17 is formed on a sliding surface, which is a surface that contacts with a shaft of the bearing. Lining layer 17 provides properties of the bearing, such as, for example, friction properties, sliding properties, seize resistance, wear resistance, conformability, foreign particle embedding properties (foreign particle robustness), and corrosion resistance. Lining layer 17 is made of a bearing alloy. To prevent adhesion with the shaft, the bearing alloy is made of a material different from that of the shaft. In this example, the bearing alloy is an aluminum based alloy since the bearing is used to support a shaft made of steel.

Overlay layer 19 improves properties of lining layer 17, for example, friction properties, conformability, corrosion resistance, and foreign particle embedding properties (foreign particle robustness). Overlay layer 19 includes a binder resin, and at least one of a solid lubricant and hard particles dispersed in the binder resin. It is preferable that overlay layer 19 consists of 30-70 vol % of solid lubricant, 0-5 vol % of hard particles, with the balance being made up of the binder resin.

The binder resin is, for example, a thermosetting resin. More specifically, the binder resin includes at least one of a polyamide-imide (PAI) resin, polyimide (PI) resin, polyamide resin, phenolic resin, polyacetal resin, poly-ether-ether-ketone resin, and polyphenylenesulfide resin.

The solid lubricant is used to improve friction properties. The solid lubricant includes, for example, at least one kind of $MoS_2$, $WS_2$, polytetrafluoroethylene (PTFE), graphite, h-BN, and $SB_2O_3$. For example, $MoS_2$ imparts enhanced lubricity; while PTFE provides a lower friction coefficient since PTFE has weak molecular cohesion; and graphite improves wettability and initial conformability. The term "initial conformability" refers to characteristics in which the sliding surface is worn away and becomes flat and smooth when the sliding surface contacts with the shaft, whereby sliding properties are improved. When the initial conformability is exerted and the sliding property is improved, a depth of wear over an entire sliding layer is reduced.

The hard particles improve wear resistance, and include, for example, at least one of SiC, $Al_2O_3$, TiN, AlN, $CrO_2$, $Si_3N_4$, $ZrO_2$, and $Fe_3P$.

The other half bearing (not shown in the figure) combined with half bearing 13 shown in FIG. 1 has an oil groove (also not shown in the figure) on the inner circumferential surface. The oil groove is formed around the center in an axial direction (a direction along which the shaft extends). The oil groove extends in a circumferential direction, which direction is equivalent to the sliding direction, and perpendicular to the axial direction. The oil groove is open to the outside through an oil hole provided at the upper side of the half bearing.

Half bearing 13 shown in FIG. 1 has indentation 21 on the inner circumferential surface. Indentation 21 is provided at a position corresponding to the oil groove of the other half bearing so as to form a single continuous oil groove.

Figure 2:
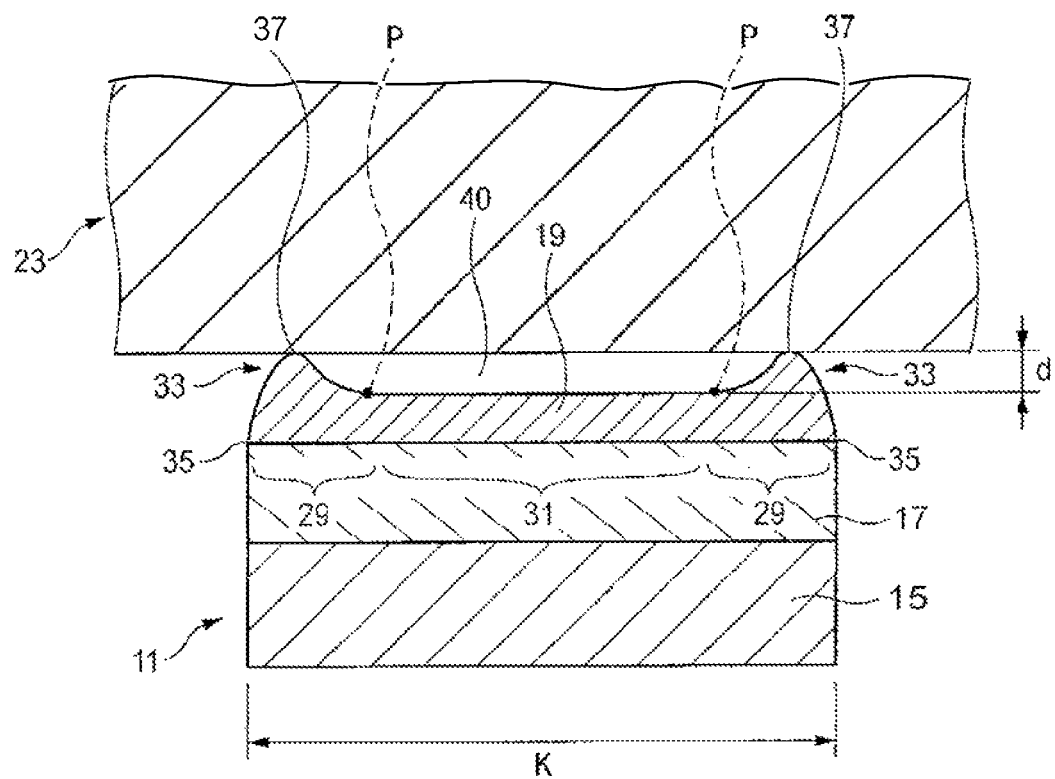
FIG. 2 shows an exemplary cross-sectional view of main bearing 11.
Figure 3:
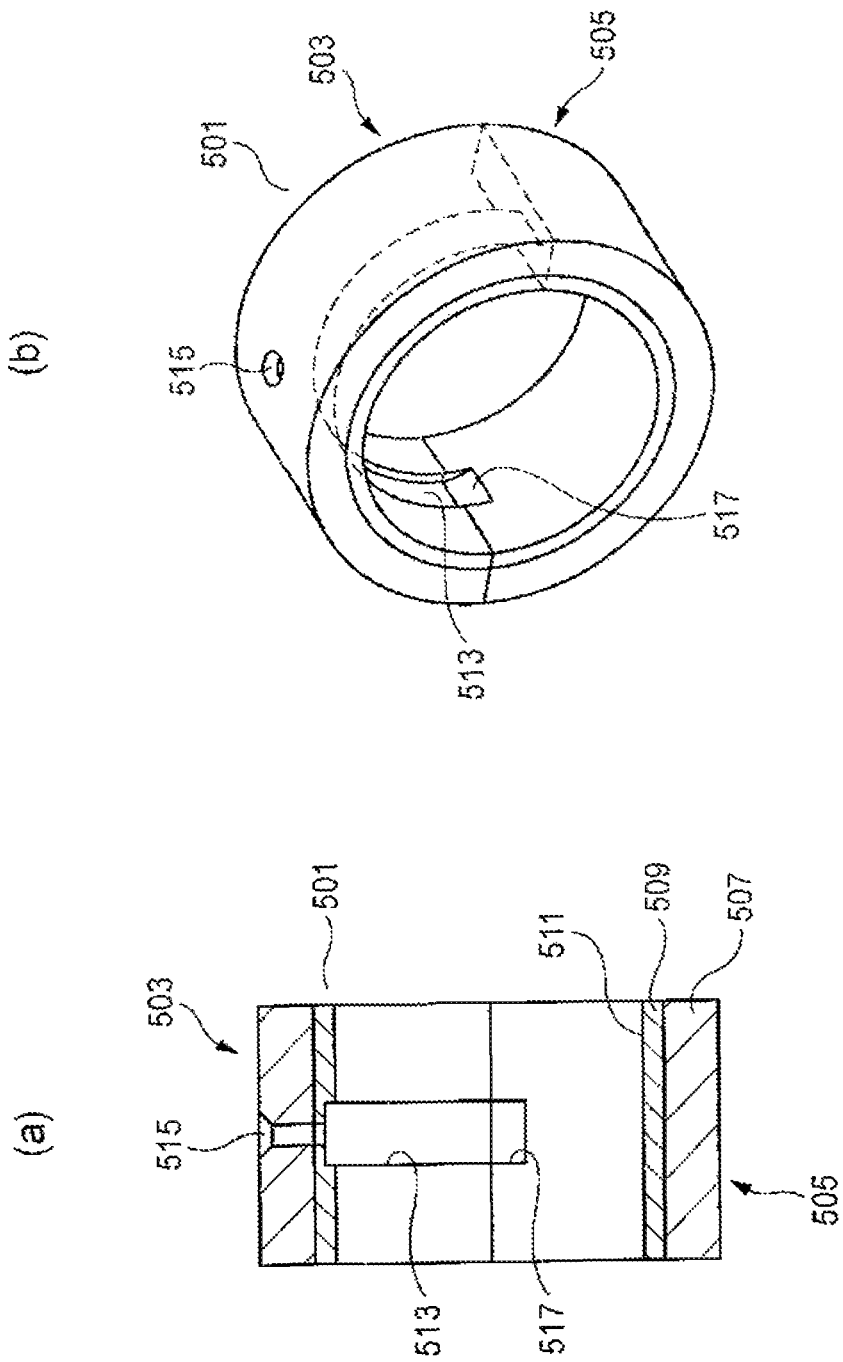
FIG. 3 shows an exemplary main bearing 501 in accordance with a related art.
Figure 4:
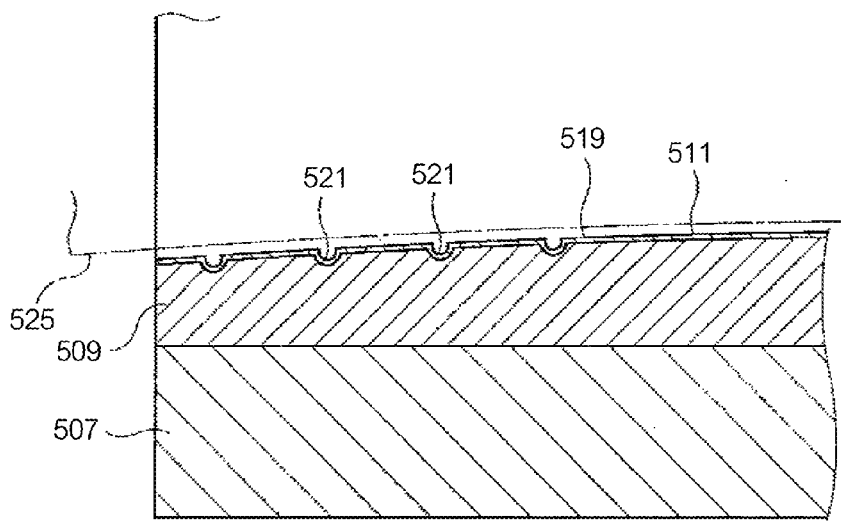
FIG. 4 shows an exemplary cross-sectional view of main bearing 501.

FIG. 2 shows an exemplary cross-sectional view of main bearing 11. The view in cross section is parallel to the axial direction and perpendicular to the sliding direction. Shaft 23, which slides along the inner circumferential surface of bearing 11, also is shown in FIG. 2. In main bearing 11, overlay layer 19, lining layer 17, and backing metal 15 are respectively laminated in an order starting from shaft 23. Overlay layer 19 has two raised portions 33. Here, the term "raised portions" refers to areas where the lining layer is higher or thicker comparative to other areas, as viewed in cross section, namely parallel to the axial direction and perpendicular to the sliding direction. In the example shown in FIG. 2, edge areas (areas 29) are thicker than the center area (area 31) while the center area has a thickness that for all practical purposes is constant. Raised portion 33 extends along the sliding direction.

In the example shown in FIG. 2, the height or thickness of overlay layer 19 is constant in area 31. Viewed in cross section, the overlay layer becomes thicker from point P towards the outside. Accordingly, point P is referred to as a starting point. Raised portion 33 has top 37. Top 37 is located outside of starting point P. More specifically, top 37 is located between starting point P and edge 35. Width K is a width of main bearing 11 in the axial direction. Starting point P is located at a position where a distance from edge 35 is less than K/2. It is to be noted that starting point P is preferable to be located at a position where a distance from (the nearest) edge 35 is less than or equal to K/3. It is preferable that the ridge line of raised portion 33 has a shape that consists of a smooth curve. In other words, a ridge line from starting point P through top 37 to edge 35 has a shape that consists of a smooth curve.

Further, it is preferable that a height d of raised portion 33, namely, a difference in thickness relative to other areas, is less than or equal to 6 micrometers.

Overlay layer 19 is formed, for example, by spray coating. More specifically, a coating liquid is made by dissolving a resin, a solid lubricant, and hard particles into a diluent. The diluent is used to adjust viscosity for ease of mixing. Any kind of diluent can be used so long as the resin can dissolve in the diluent. For example, if a polyamide-imide is used as the resin, an organic solvent such as xylene, N-Methyl-2-pyrrolidone, or toluene can be used as the diluent. Next, the coating liquid is applied to lining layer 17, which is a base layer, by spraying. The coating liquid is applied in a thick layer, for example, in a thickness more than or equal to 3 micrometers. After application, the coating liquid is dried to form overlay layer 19. Upon drying, raised portion 33 is formed under surface tension of the coating liquid. Height d of raised portion 33 is controlled based on, for example, a concentration of the coating liquid, a thickness of the applied coating liquid, a drying temperature, or a drying time. According to this method, raised portion 33 can be formed with little equipment, for example, there is no need for use of equipment for electrolytic plating regardless of a shape of the base layer, namely, the lining layer or the backing metal, since the raised portion is formed under surface tension.

In another example, overlay layer 19 may be formed by roll coating (roll transfer). In such an example, the coating liquid is applied by use of a drum-shaped roller. Here, the term "drum-shaped roller" refers to a roller a diameter of which at a central portion is greater than that of the edge portion in a direction of axis of rotation. The diameter gradually decreases from the center portion to the edge portions. Height d of raised portion 33 is controlled by, for example, the outer shape of the drum-shaped roller. Instead of the roll coating, overlay layer 19 may be formed by, tumbling, dipping, brush painting, or printing.

Main bearing 11 retains lubrication oil by way of oil-retaining part 40 defined by raised portions 33. Oil-retaining part 40 enables the lubrication oil to be brought between shaft 23 and main bearing 11, as a result of which contact between shaft 23 and main bearing 11 is reduced.

EXAMPLES OF EXPERIMENTS

Experiment samples (working examples 1-7 and comparative examples 1-4) in which height d (difference in layer thickness in overlay layer 19) and starting point P were varied, were prepared. In these experiment samples, a starting torque was measured. The starting torque is an index of thickness of the oil film formed between shaft 23 and main bearing 11. Since it is difficult to directly measure the thickness of the oil film, the starting torque is measured as an index of thickness of the oil film. A smaller starting torque indicates a thicker oil film.

The method of preparing the experiment samples was as follows. To form lining layer 17, an aluminum alloy was welded by pressure welding onto backing metal 15 made of steel. The samples were processed to form a half cylindrical shape. Material of overlay layer 19 was diluted with a solvent (N-Methyl-2-pyrrolidone) to form a coating liquid. The coating liquid was applied to the samples by using an air spray. The samples were dried at 120° C. for 20 minutes, and then baked at 250° C. for 60 minutes.

Properties that the working examples 1-7 and comparative examples 1-4 have in common are as follows.

Width K of the bearing: 15 mm.
Thickness of the overlay layer at the center: 6 μm.
Composition of the overlay layer: binder resin (PAI) 49 vol %
solid lubricant ($MoS_2$) 50 vol %
hard particles (SiC) 1 vol %

Height d and starting point P of the experimental samples are as shown in Table 1.

The starting torque was measured for these samples. The starting torque [Nm] was measured for the main bearings prepared using the method above, with the main bearings being installed in a connecting rod of an actual engine.

Table 1 shows the measurement results for the experiment examples.

TABLE 1

|  | Height d, which is the difference in thickness at the center and that at the edge in the axial direction (μm) | Starting point P | Starting torque (Nm) |
| --- | --- | --- | --- |
| Working example 1 | 1 | K/3 | 1.9 |
| Working example 2 | 1 | K/6 | 1.8 |
| Working example 3 | 3 | K/3 | 1.8 |
| Working example 4 | 3 | K/4 | 1.7 |
| Working example 5 | 3 | K/6 | 1.7 |
| Working example 6 | 6 | K/3 | 1.9 |
| Working example 7 | 6 | K/6 | 1.8 |
| Comparative example 1 | 0 | — | 2.2 |
| Comparative example 2 | 3 | K/2 | 2.4 |
| Comparative example 3 | 6 | K/2 | 2.5 |
| Comparative example 4 | 10 | K/4 | 2.4 |

As shown in Table 1, the starting torque of experiment samples (working examples 1-7) with height d of 1 to 6 μm and starting point P of K/3 to K/6 were lower than those of experiment samples (comparative examples 1-4) with height d out of 1-6 μm and starting point P of K/2. In other words, it is expected that the thickness of the oil film of the working examples would be greater than that of the comparative examples.

Even if height d was in a range of 1 to 6 μm, the starting torque was high with starting point P of K/2. For example, comparing working example 6, working example 7, and comparative example 3, the starting torque of the sample (comparative example 3) with starting point P of K/2 was higher than that of other samples (working examples 6 and 7). In other words, of these three samples, comparative example 3 had the thinnest oil film. Further, even if starting point P was in a range of P<K/2, the starting torque was high with height d being outside a range of 1 to 6 μm. For example, comparing working example 4 and comparative example 4, the starting torque of the sample (comparative example 4) with height d of 10 μm is higher than that of the other sample (working example 4). In other words, of these two samples, comparative example 4 had the thinner oil film.

The main bearing according to the present embodiment retains more oil during engine stoppage, thereby reducing friction torque when the engine is started. This reduction in friction torque improves fuel economy performance. Further, even if the engine is in a state such that local contact is liable to occur, seizure of the main bearing is prevented since direct contact with the shaft can be avoided by feeding oil into a gap between the shaft and the bearing.

The present invention is not limited to the embodiments described above, and any reasonable modification can be made to the embodiments. In the embodiments, a material, shape, size, number, and location of elements are stated merely as examples. For example, instead of combining two half bearings to obtain a cylindrical shaped bearing, a single-piece part may be processed to form a cylindrical shaped bearing. The bearing may be of an elliptical cylindrical shape instead of a circular cylindrical shape. Further, the present invention may be applied to a sliding member other than a bearing.

For example, the composition of overlay layer 19 is not limited to PAI+MOS2+SiC, which is described in the embodiments. The composition of overlay layer 19 may be PAI+PTFE or PAI+Gr+SiC. Plural kinds of solid lubricant may be combined, and plural kinds of hard particles may be combined to form overlay layer 19.

Figure 5:
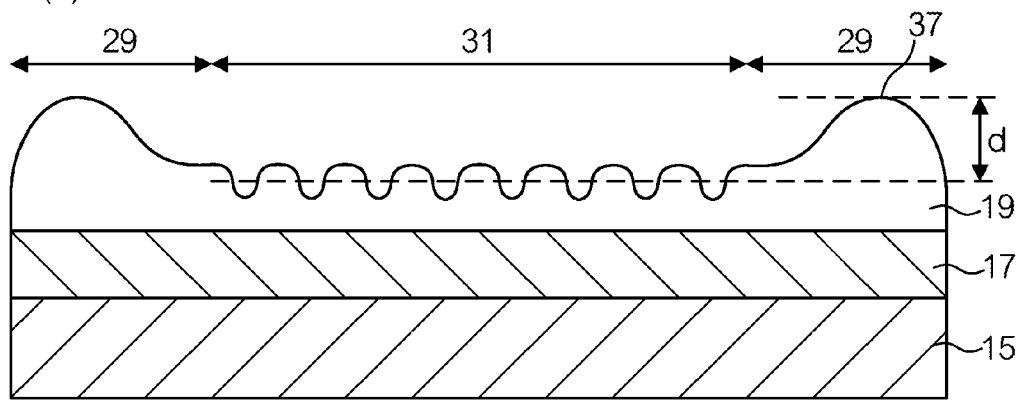
FIG. 5 shows another exemplary cross-sectional view of main bearing 11.
Figure 5:
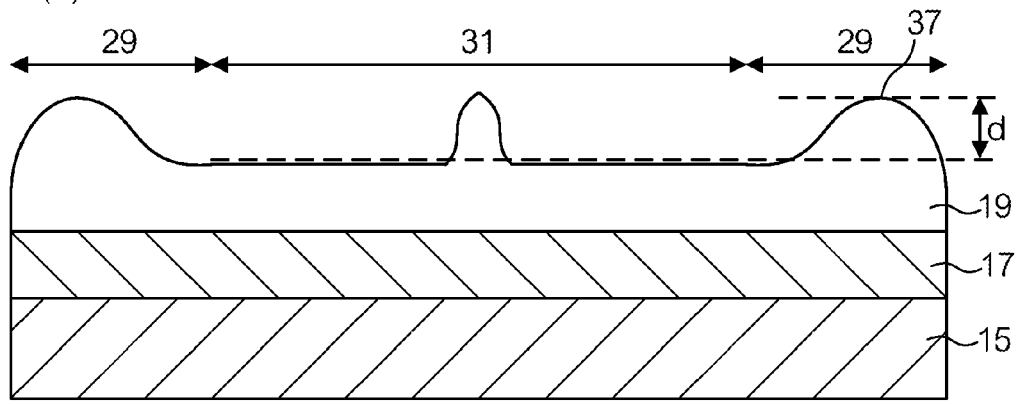

FIG. 5 shows another exemplary cross-sectional view of main bearing 11. In the above embodiment, thickness of overlay layer 19 is constant in area 31 which is an area other than raised portion 33. The thickness of overlay layer 19 in area 31 need not be constant. FIG. 5(a) shows an example in which plural grooves are provided on overlay layer 19. In such a case, height d is defined as the difference between the average thickness in area 31 and the thickness at top 37. Alternatively, height d may be defined as the difference between the minimum thickness in area 31 and the thickness at top 37. FIG. 5(b) shows an example in which a raised portion is provided on overlay layer 19 in area 31. In such a case, height d is defined as the difference between the average thickness (or the minimum thickness) in area 31 and the thickness at top 37. To conclude, height d is defined as the difference between a representative value of thickness in area 31 and the thickness at top 37. The representative value of thickness may be, for example, an average, a minimum, or a maximum.

In a case that the thickness in area 31 is not constant, starting point P may be defined as, for example, a point where the difference between the thickness at the point and the average (or the minimum) thickness of overlay layer 19 exceeds a threshold. Alternatively, raised portion 33 may be defined as a predetermined area including top 37 (for example, an area where the difference between the thickness of the area and the thickness at the top 37 is less than or equal to a threshold), and starting point P may be defined as the border of the raised portion 33.

What is claimed is:

1. A sliding member comprising:
    a lining layer formed from an alloy having a predetermined shape; and
    an overlay layer formed on an inner circumferential surface of the lining layer, the overlay layer being formed of resin, the overlay layer being configured to slide along a shaft, the overlay layer including a raised portion in a predetermined area at each axial edge of the overlay layer, a height of the raised portion being greater than a height of an entire remainder of the overlay layer,
    in a cross section parallel to an axial direction, the height of the overlay layer gradually decreases from a top of the raised portion to the axial edge.

2. The sliding member according to claim 1, wherein the raised portion includes the top between a starting point and the axial edge of the overlay layer, the starting point being an inboard edge of the raised portion,
the sliding member has a width K in the axial direction, and a distance between the starting point and the axial edge of the overlay layer is less than K/2.

3. The sliding member according to claim 2, wherein a difference between a first thickness and a second thickness is less than or equal to 6 micrometers, the first thickness being a thickness of the overlay layer at the entire remainder of the overlay layer, the second thickness being a thickness of the overlay layer at the top.

4. The sliding member according to claim 1, wherein the overlay layer consists of at least one of a solid lubricant and hard particles in addition to a binder resin.

5. The sliding member according to claim 4, wherein the binder resin consists of at least one of a polyamide-imide (PAI) resin, polyimide resin, phenolic resin, polyacetal resin, poly-ether-ether-ketone resin, and polyphenylenesulfide resin.

6. The sliding member according to claim 5, wherein the solid lubricant consists of at least one of $MoS_2$, PTFE, graphite, $WS_2$, and $SB_2O_3$.

7. The sliding member according to claim 6, wherein the hard particles consist of at least one of SiC, $Al_2O_3$, AlN, $CrO_2$, $Si_3N_4$, $ZrO_2$, and $Fe_3P$.

8. The sliding member according to claim 5, wherein the hard particles consist of at least one of SiC, $Al_2O_3$, AlN, $CrO_2$, $Si_3N_4$, $ZrO_2$, and $Fe_3P$.

9. The sliding member according to claim 4, wherein the solid lubricant consists of at least one of $MoS_2$, PTFE, graphite, $WS_2$, and $SB_2O_3$.

10. The sliding member according to claim 9, wherein the hard particles consist of at least one of SiC, $Al_2O_3$, AlN, $CrO_2$, $Si_3N_4$, $ZrO_2$, and $Fe_3P$.

11. The sliding member according to claim 4, wherein the hard particles consist of at least one of SiC, $Al_2O_3$, AlN, $CrO_2$, $Si_3N_4$, $ZrO_2$, and $Fe_3P$.

12. The sliding member according to claim 1, wherein the lining layer includes an axially extending surface on which the overlay layer is formed, the axially extending surface being substantially planar in cross section.

13. A sliding member comprising:
a lining layer formed from an alloy having a predetermined shape; and
an overlay layer formed on an inner circumferential surface of the lining layer, the overlay layer being formed of resin, the overlay layer being configured to slide along a shaft,
the overlay layer including:
a first radially projecting rib extending in a circumferential direction along a first axial edge of the overlay layer,
a second radially projecting rib extending in the circumferential direction along a second axial edge of the overlay layer, and
an uninterrupted surface occupying an entire area between a base of the first rib and a base of the second rib,
the uninterrupted surface being:
recessed relative to the first and second ribs, and
substantially planar in cross section,
in a cross section parallel to an axial direction, the height of the overlay layer gradually decreases from a top of the first and second radially projecting ribs to the first and second axial edges, respectively.

14. The sliding member according to claim 13, wherein the sliding member has a width K in the axial direction, and
a distance between an inboard starting point of each of the first and second ribs and each of the first and second axial edges, respectively, is less than K/2.

15. The sliding member according to claim 14, wherein the overlay layer has a first thickness from the lining layer to the uninterrupted surface,
the overlay layer has a second thickness from the lining layer to a vertex, and
a difference between the first thickness and the second thickness is less than or equal to 6 micrometers.

16. The sliding member according to claim 13, wherein the overlay layer consists of at least one of a solid lubricant and hard particles in addition to a binder resin.

17. The sliding member according to claim 16, wherein the binder resin consists of at least one of a polyamide-imide (PAI) resin, polyimide resin, phenolic resin, polyacetal resin, poly-ether-ether-ketone resin, and polyphenylenesulfide resin.

18. The sliding member according to claim 16, wherein the solid lubricant consists of at least one of $MoS_2$, PTFE, graphite, $WS_2$, and $SB_2O_3$.

19. The sliding member according to claim 16, wherein the hard particles consist of at least one of SiC, $Al_2O_3$, AlN, $CrO_2$, $Si_3N_4$, $ZrO_2$, and $Fe_3P$.

20. The sliding member according to claim 13, wherein the lining layer includes an axially extending surface on which the overlay layer is formed, the axially extending surface being substantially planar in cross section.

* * * * *